March 22, 1966  C. ANDERSON  3,241,233
PIPE CUTTER

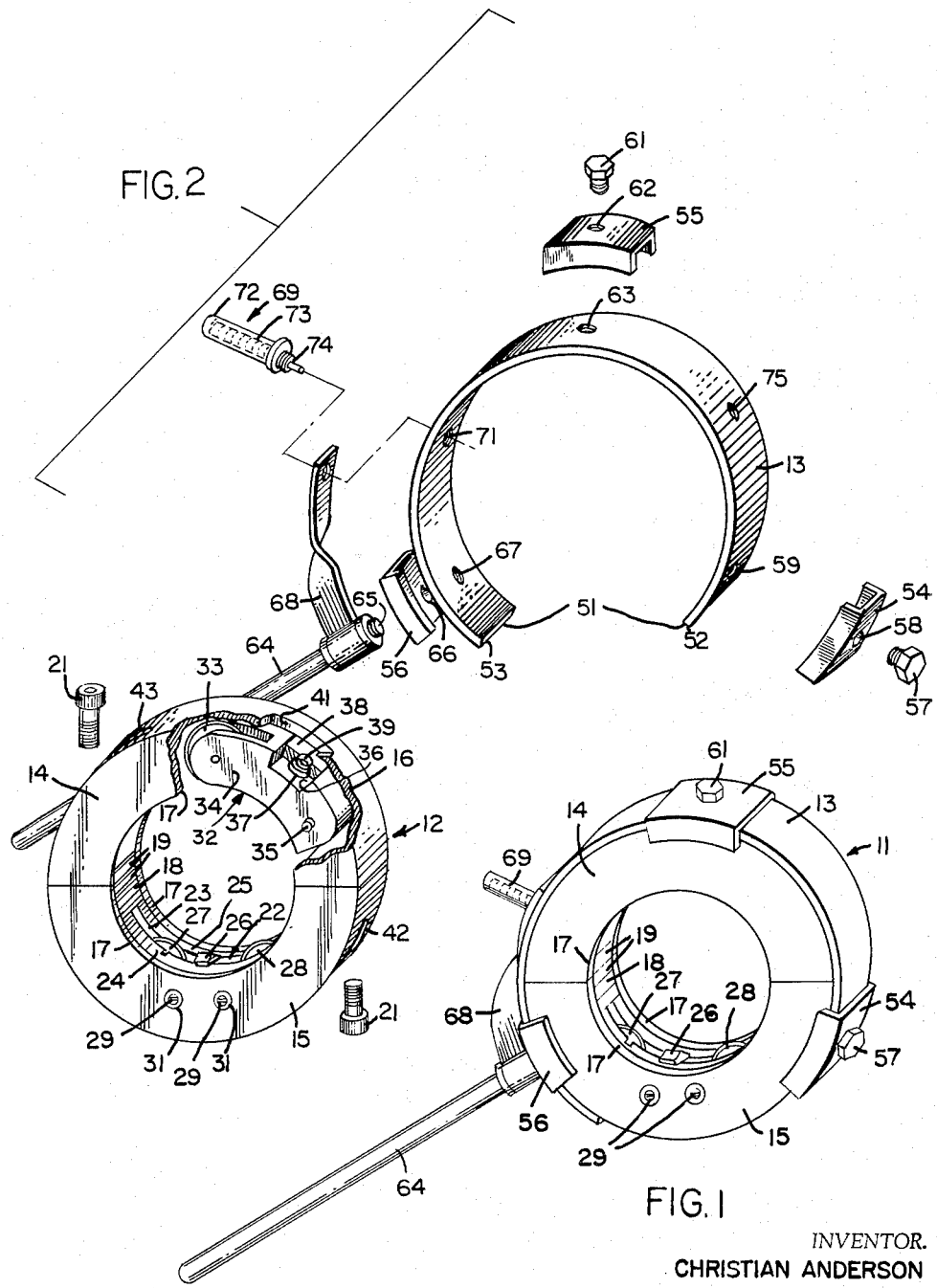

Filed Aug. 21, 1964  2 Sheets-Sheet 2

INVENTOR.
CHRISTIAN ANDERSON
BY
*Porter & Meyer*
ATTORNEYS

United States Patent Office 3,241,233
Patented Mar. 22, 1966

3,241,233
PIPE CUTTER
Christian Anderson, West Baldwin, Maine
Filed Aug. 21, 1964, Ser. No. 391,136
5 Claims. (Cl. 30—98)

This invention relates to a pipe cutting tool. More particularly it relates to a pipe cutting tool especially adapted to cut pipe while the pipe is located in an inaccessible location where working space around the pipe is limited.

Frequently it is necessary to remove a section of pipe from a length of pipe that has already been installed. Under such circumstances working space may well be seriously limited due for example to the proximity of other pipes or structure, or due to the position of the pipe as in an underground location.

It is a purpose of this invention to provide a pipe cutting tool that can be assembled about a pipe and manipulated entirely from one side. It is a further purpose of this invention to provide such a pipe cutting tool with the capability of forming a precisely located accurately scribed cut to facilitate the replacement of the removed section with a fitting or replacement section. It is a further purpose of this invention to provide such a pipe cutting tool with interchangeable cutting bits so that the shape of the cut may be predetermined and particularly that the cut and of the pipe will be left in condition for V-groove welding, of a fitting or replacement section. It is a further purpose of this invention to provide such a pipe cutting tool especially adapted to cut stainless steel pipe of large diameter.

These and other purposes of this invention will become apparent from the following description and from the drawings, in which:

FIG. 1 is a perspective view of the assembled pipe cutting pool.

FIG. 2 is a break-away perspective view corresponding to FIG. 1 showing the various elements making up the pipe cutting tool of the present invention.

Figure 3:
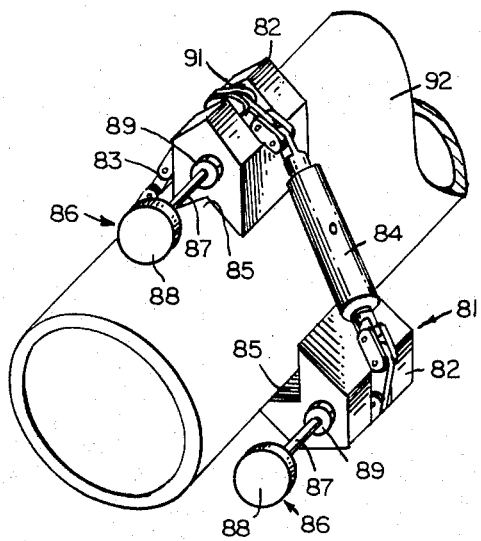
FIG. 3 is a perspective view of a starting guide especially adapted to be used in conjunction with the pipe cutting tool of the present invention.

The pipe cutting tool of the present invention indicated generally at 11 includes a hollow cylindrical cutting body or annulus 12 adapted to surround the pipe to be cut, and a generally circular clamping band 13 adapted to surround body 12. Cylindrical body 12 comprises two half elements 14 and 15 adapted to join one another along a common radius.

Each of half elements 14 and 15 has a generally U-shaped cross section formed by an exterior wall indicated at 16 and two side walls indicated at 17 leaving an annular space indicated at 18 between the side walls 17 and contiguous to the minor circumference of body 12. Each half element 14 and 15 is provided with a pair of end walls 19 located adjacent to the common radius. The minor diameter of body 12 is sufficient in size that when the two half elements 14 and 15 are assembled with complementary end walls 19 in contact with each other, body 12 will have a sufficient internal clearance to surround the pipe to be cut leaving an adequate space therearound.

The two half elements 14 and 15 are held together by means of a pair of bolts 21 which cooperate with mating holes provided in end walls 19 for that purpose. For reasons which will appear below, the two bolts 21 are inserted in the same direction radially, but in opposite directions in plan view. To insure close contact between abutting end walls 19 only the second of a pair of cooperating bolt receiving holes is threaded, the second such end wall 19 thus being drawn into close contact with the first such end wall 19 by the contact of the head of bolt 21 with the backside of said first said end wall 19.

A cutting tool assembly 22 is provided in annular space 18 of half element 15. Cutting tool assembly 22 comprises a body 23 split longitudinally into two half elements 24 and 25. Between half elements 24 and 25 there are mounted the tool bit 26 in a groove provided for that purpose and on either side thereof rotatable cutter wheels 27 and 28. Assembly 22 is designed to fit within annular space 18 with its exposed surface shaped along the same radius as that of the minor diameter of cutter body 12. Assembly 22 is held in fixed position by means of cap bolts 29 which pass through apertures 31 provided in one side wall 17 of half element 15 such that cutter wheels 27 and 28 are both equidistant from the center of symmetry of cutter body 22 and the longitudinal axis of tool bit 26 coincides with a radius from such center.

Cap bolts 29 also serve to hold bit 26 in a fixed but radially adjustable position in the groove provided for that purpose in half elements 24 and 25 of body 23. Half elements 24 and 25 are connected at the ends thereof beyond cutter wheels 27 and 28. Cap bolts 29 pass through side wall 17, through half element 24 and cooperate with a threaded hole provided in half element 25. Cap bolts 29 are located between cutter wheel 27 and bit 26 in one case and between cutter wheel 28 and bit 26 in the other. Apertures 31 provided in side wall 17 to receive cap bolts 29 are each provided with an internal shoulder (not shown) against which the base of the head of bolts 29 rest. Thus when bolts 29 are tightened half element 25 in the vicinity of tool bit 26 is drawn toward half element 24 thus holding bit 26 firmly in place. To adjust the radial position or to replace bit 26 it is merely necessary to loosen cap bolts 29. Cutting tool assembly 22, however, cannot be removed from half element 15 unless bolts 29 are backed all of the way out of abutting element 24.

A cutting wheel assembly 32 is provided in the annular space 18 of cutter body half element 14. Cutting wheel assembly 32 comprises a cutting wheel 33 pivotally mounted in one end of laterally extending arm 34. The other end of arm 34 is suitably mounted on arm pin 35 which passes through side walls 17 of half element 14. Cutting wheel assembly 32 is so arranged that the point of contact between cutting wheel 33 and a pipe is approximately diametrically opposed to bit 26. Arm 34 of course is suitably curved to fit within annular space 18.

A recess 36 is provided on the top surface of arm 34 between cutting wheel 33 and mounting pin 35. A shouldered feed screw 37 which passes through a tapped hole in arm 34 is provided in recess 36 with its head normally adjacent to the surface of recess 36. A thrust block 38 is provided located in recess 36 and having one surface of said block 38 resting against the underside of outside wall 16 of half element 14 and the other surface resting against the head of screw 37. An aperture 39 is provided in thrust block 38 and a mating aperture 41 is provided in outside wall 16 of half element 14 so that an appropriate tool may be inserted through contact screw 37 and rotate the same relative to arm 34.

Motion of the head of screw 37 away from arm 34 forces the thrust block 38 against the underside of wall 16 of half element 14. This causes arm 34 to pivot around pin 35 forcing cutting wheel 33 away from wall 16 and toward bit 26.

Aperture 41 is one of a series of ratchet slots substantially evenly distributed about the outer periphery of cutter body 12 and extending through outer wall 16 along a circumferential line approximately half way between side walls 17. Each such slot is substantially U-shape having a semi-circular section at one end and parallel side walls. The sides of each such slot is substantially vertical in the curved portion and along the side walls and an upwardly sloped wall adapted to disengage a ratchet from the slot is provided on the end opposite the curved wall. As shown six such slots are provided of which only three appear in FIG. 2 because of the angle of the view. Ratchet slot 42 is arranged near the right hand end of half element 15 (as shown) in a position to permit the passage of clamping bolt 21 and of a suitable wrench for tightening bolt 21. A similar slot (not shown) is provided at a diametrically opposed position in the left hand end of half element 14 for the passage of the other clamping bolt 21. A similar ratchet slot (not shown) is provided immediately behind the location of bit 26 so that the radial position of bit 26 may be adjusted readily. Two additional ratchet slots are provided, one (not shown) in the lower left hand quadrant of half element 15, and the other 43 in the upper portion of half element 14. It will be understood of course that the individual ratchet slot may be varied in length or width as necessary to fulfill a secondary function, if there be such, of providing access so long as in each case there is a semi-circular ratchet engaging wall at one end and a sloping surface to permit disengagement of the ratchet at the other end, and provided of course that the ratchet slot has sufficient length to receive the ratchet.

Clamping band 13 is a circular piece of strap metal with a cut-away portion indicated at 51 between end 52 and 53 of sufficient width to permit band 13 to be slipped over the pipe to be cut. Band 13 is designed to slip over assembled cutter body 12 and to rest in sliding engagement with outside wall thereof. Band 13 is provided with a plurality of channel members acting as band guides indicated at 54, 55 and 56. Each band guide has a flat back portion adapted to overlie clamping band 13 and a downwardly extending section on either end thereof adapted to pass alongside of a substantial portion of side wall 17 of cutter body 12 on either side serving as a guide keeping band 13 in position.

Band guide 54 is held in place by screw 57 which passes through aperture 58 and guide 54 and which engages tapped hole 59 provided in band 13. Similarly band guide 55 is held by screw 61 which passes through aperture 62 and engages in tapped hole 63.

The remaining band guide 56 is held in place by the threaded end 65 of crank arm 64 which passes through aperture 66 in guide 56 and engages tapped hole 67 in band 13. Crank arm 64 is provided with an offset support arm 68 which support arm is adapted to engage and support ratchet element 69. Ratchet element 69 is adapted to cooperate with and engage in aperture 71 of band 13.

Ratchet element 69 comprises ratchet body 72, a ratchet spring 73 and a ratchet plunger 74. Ratchet element 69 is removably attached to band 13. Ratchet plunger 74 is adapted to pass through aperture 71 under the force of spring 73 and to engage successive ratchet slots e.g. slots 41, 42, and 43. An additional unused aperture 75 is provided in band 13 to serve as an access port to cutter body 12 if necessary.

To use pipe cutter 11 of the present invention the two half elements 14 and 15 of cutter body 12 are placed about the pipe to be cut and arranged such that end walls 19 of both half bodies contact each other. Clamping bolts 21 are then inserted through the appropriate ratchet slot such as ratchet slot 42 and secured. Clamping band 13 is then slipped over the pipe and over assembled cutter body 12. The subsequent order of assembly is not critical, but typically the assembly of pipe cutter 11 is completed as follows. Band guides 54, 55 are then arranged over clamping band 13 and secured into position by screws 57 and 61. Band guide 56 is then arranged in proper position and secured into place by crank arm 64. Finally ratchet element 69 is secured into position. It will be noted that the entire assembly operation can be accomplished with very little free space around the pipe and if the several parts are manipulated properly by working entirely from one side of said pipe.

To cut the pipe feed screw 37 is turned out by a suitable tool operating through aperture 41 while aperture 41 is exposed either by cut-away portion 51 of band 13, or access aperture 75 of band 13 until cutter wheel 33 comes into firm contact with the pipe to be cut forcing tool bit 26 into contact with the other side of the pipe. In normal adjustment tool bit 26 is so positioned in cutter tool assembly 22 that the tip of tool bit 26 digs into the surface of the pipe a depth equal to the desired cut before either cutter wheel 27 or cutter wheel 28 contacts the surface of the pipe. While the position of tool bit 26 and thus the depth of the cut can be adjusted while cutter body 12 is in position surrounding the pipe it is generally more convenient where possible to adjust the depth of the cut prior to such assembly. Through the cooperation of ratchet element 69 and the ratchet slots provided in cutter body 12 reciprocal motion of crank arm 64 will rotate cutter body 12 about the pipe. At frequent intervals and normally after each rotation feed screw 37 is turned out sufficiently to keep tool bit 26 in firm cutting contact with the pipe surface.

The shape of the cut is determined by the shape of the cutting edge of cutter bit 26. A broad V cut is preferred to facilitate later V-groove welding of a fitting or a replacement section. As soon as a groove of sufficient depth has been established in the pipe cutter wheel 27, 28 and 33 will run along the bottom of that groove keeping cutter body 12 in the proper position on the pipe until the cut is completed and the pipe severed. Normally it is necessary to provide a guide (in case of a vertically oriented pipe) or a pair of guides (in the case of a horizontally oriented pipe) to keep cutter body 12 in exactly the desired position until a cut of sufficient depth has been established to render cutter wheels 27, 28 and 33 operative as tracing guides.

Figure 4:
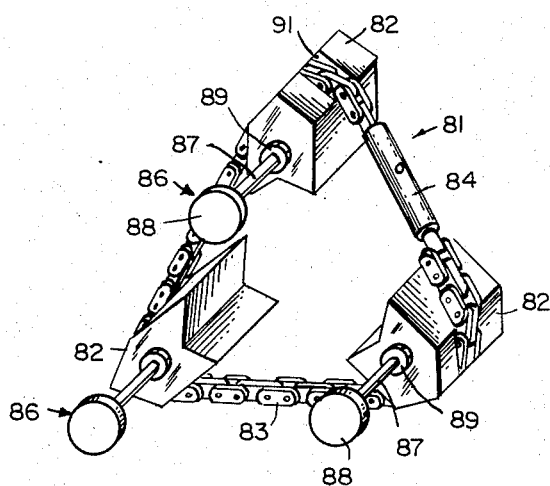
FIG. 4 is a perspective view of the starting guide corresponding to FIG. 3 but with the pipe removed for clarity.

A suitable guide assembly 81 for this purpose is shown in FIGS. 3 and 4. Guide assembly 81 comprises a plurality (three or more) of guide box 82 connected by a chain 83. The two ends of the chain 83 are connected by a turn buckle 84. Each guide block 82 is provided on its underside (i.e. the side opposite the chain) with a longitudinal V-shaped indentation indicated at 85, and on one end wall with a guide button assembly 86. Each guide button assembly 86 comprises a threaded shaft 87 adapted to engage in and cooperate with a suitable aperture in the corresponding guide block 82, a flat headed guide button 88 arranged at the end of shaft 87 and a lock nut 89. The top side of each guide block 82 is provided with a groove 91 adapted to receive chain 83. Fastening means (not shown) are provided to hold chain 83 in place in the appropriate groove 91.

To use guide assembly 81 turnbuckle 84 is disengaged, the free ends of chain 83 are passed around pipe 92 and the guide blocks 82 are arranged around pipe 92 with the sharp edges of indentations 85 in contact with pipe 92. After guide assembly 81 has been located approximately turnbuckle 84 is reengaged and the chain 83 tightened to firmly position guide blocks 82. Guide buttons 88 are then positioned accurately by rotating the appropriate shaft 87 and are locked into position by lock nuts 89.

Guide assembly 81 is so arranged that guide buttons 88 will engage side wall 17 of cutter body 12 in sliding contact. As mentioned above, in the case of a horizontally oriented pipe two such guide assemblies 81 arranged in either side of pipe cutter 11 with guide buttons 88 of each said guide assembly 81 in sliding contact with the appropriate side walls 17 of cutter body 12 will exactly locate the position of the cut. In the case of a vertically oriented pipe only a single guide assembly 81 located below pipe cutter 11 will normally be necessary to establish accurately the position of the cut.

I claim:

1. A pipe cutting tool comprising a cylindrical body adapted to surround a pipe to be cut, said cylindrical body formed of two semi-cylindrical half elements adapted to be fastened together, pipe cutting means including a pipe cutting bit arranged inwardly in one said half element, adjustable pipe contacting means arranged in the other said half element and adapted when adjusted to force said bit into contact with said pipe, drive means for rotating said body about said pipe and guide means for maintaining said bit means in a fixed and predetermined path, said drive means including a circular band adapted to overlie said cylindrical body, ratchet means arranged on said band and adapted to cooperate with ratchet slots arranged about the periphery of said body, drive means adapted to move said band relative to said body and guide means cooperating with said body and with said band to maintain said band in sliding contact with said body.

2. A pipe cutting tool as claimed in claim 1 wherein said guide means comprises a pipe contacting rotatable wheel on said pipe contacting means and a pair of pipe contacting rotatable wheels mounted on either side of said pipe cutting bit adjacent thereto said wheels arranged to engage the bottom of the cut formed by said bit.

3. A pipe cutting tool as claimed in claim 2 wherein there additionally is provided a supplemental guide assembly comprising a plurality of individual guide elements adapted to be arranged about said pipe, each said guide element adapted to contact the side of said cylindrical body in sliding contact, flexible means connecting said guide elements in fixed spatial relation and adjustable means cooperating with said flexible means for bringing said guide elements into firm contact with said pipe.

4. A pipe cutting tool as claimed in claim 3 wherein each said guide element comprises a body adapted to contact said pipe, a guide button provided with a flat head adapted to contact said cylindrical body and adjustable means adapted to retain said guide button in fixed but adjustable relation to said body.

5. A pipe cutting tool as claimed in claim 1 wherein said guide means are removably attached to said band whereby said band can optionally be removed from said body.

References Cited by the Examiner

UNITED STATES PATENTS

| | | | |
|---|---|---|---|
| 996,602 | 7/1911 | Anderson | 30—99 |
| 1,279,022 | 9/1918 | Scott | 30—96 |
| 1,310,957 | 7/1919 | Nonneman | 30—98 |
| 1,394,781 | 9/1921 | Nonneman | 30—98 |
| 1,727,225 | 9/1929 | Acres | 30—96 |

WILLIAM FELDMAN, *Primary Examiner.*

MYRON C. KRUSE, *Examiner.*